United States Patent [19]

Minagawa et al.

[11]  4,243,581
[45]  Jan. 6, 1981

[54] STABILIZED POLYPROPYLENE COMPOSITION

[75] Inventors: Motonobu Minagawa; Mitsuo Akutsu, both of Urawa; Hiroshi Fujiwara, Omiya; Masayuki Kashiki, Soka, all of Japan

[73] Assignee: Maruzen Oil Co., Ltd., Osaka, Japan

[21] Appl. No.: 934,654

[22] Filed: Aug. 17, 1978

[30] Foreign Application Priority Data

Aug. 17, 1977 [JP] Japan .................. 52-98928

[51] Int. Cl.³ .............................. C08K 5/36
[52] U.S. Cl. .................. 260/45.85 S; 260/45.95 H
[58] Field of Search .............. 260/45.85 S, 45.95 B; 526/313

[56] References Cited

U.S. PATENT DOCUMENTS

| | | | |
|---|---|---|---|
| 3,190,852 | 6/1965 | Doyle | 260/45.85 S |
| 3,457,328 | 7/1969 | Blatz et al. | 526/313 |
| 3,477,991 | 11/1969 | Patton et al. | 526/313 |
| 3,930,047 | 12/1975 | Dale | 260/45.95 B |

FOREIGN PATENT DOCUMENTS 971753 10/1964 United Kingdom .

Primary Examiner—V. P. Hoke

Attorney, Agent, or Firm—Sughrue, Rothwell, Mion, Zinn and Macpeak

[57]  ABSTRACT

A propylene polymer composition stabilized against oxidative degradation comprising
(1) 100 parts by weight of a propylene polymer,
(2) 0.001 to 5 parts by weight of a poly(tertiary-butylated p-vinyl phenol) composed substantially of monomeric units represented by the following formula (I)

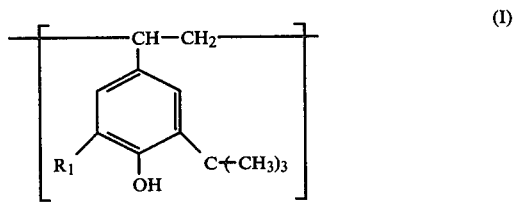

wherein $R_1$ represents a hydrogen atom or a tertiary butyl group, and
(3) 0.001 to 5 parts by weight of a dialkylthiodipropionate represented by the following formula (II)

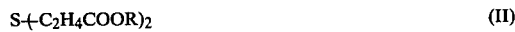

wherein R represents an alkyl group containing 10 to 20 carbon atoms.

6 Claims, No Drawings

STABILIZED POLYPROPYLENE COMPOSITION

BACKGROUND OF THE INVENTION

1. Field of the Invention

This invention relates to a propylene polymer composition stabilized against oxidative degradation comprising (1) a propylene polymer, (2) a poly(tertiary-butylated p-vinyl phenol) as a stabilizer, and (3) a dialkylthiodipropionate as an auxiliary stabilizer.

2. Description of the Prior Art

Polypropylene is a crystalline polymer having a high molecular weight and a high degree of stereoregularity. Because of its high melting point and high strength, polypropylene has found extensive applications as films fibers, tubings and molded articles.

Polypropylene has a number of hydrogen atoms on tertiary carbon atoms in the polymer chain. The hydrogen atoms on the tertiary carbon atoms are very reactive, and are a cause of oxidative degradation. Furthermore, polypropylene frequently contain catalyst residues containing titanium and aluminum employed at the time of polymerization, and these catalyst residues catalytically accelerate the degradation of polypropylene.

Accordingly, a great need exists for stabilizers capable of inhibiting the degradation of polypropylene. The previous practice has been to employ stabilizers effective for polyethylene to polypropylene. However, since polypropylene is fabricated at far higher temperatures than polyethylene, many stabilizers effective for polyethylene do not always exhibit stabilizing effects on polypropylene. Many of these stabilizers are effective only for short periods of time, or are hardly effective at all. For this reason, the use of polypropylene has been markedly restricted despite the superior properties of polypropylene.

Of the stabilizers heretofore used, phenolic anti-oxidants such as 2,6-di-tert.-butyl-p-cresol and 4,4'-n-butylidene-bis(2-tert.-butyl-5-methylphenol) have relatively great effects, and are used as additives for polypropylene resins. Since, however, the processing temperature for polypropylene resins is high, these compounds volatilize during processing, or are easily extracted from the resins by water, oils, etc. As a result, these compounds are capable of stabilizing the resins only for a short period of time. Attempts have also been made to improve the resistance of these stabilizers to volatilization and extraction by increasing their molecular weight, and a low-molecular-weight condensate between phenol and formaldehyde has been suggested, e.g., as disclosed in *Die Makromolekulare Chemie*, 152, 105–120 (1972). This condensate, however, has only a low stabilization effect, is not capable of stabilizing synthetic resins over long periods of time, and colors the resins. In particular, polypropylene resins susceptible to oxidative degradation are difficult to stabilize with these compounds.

British Pat. No. 971,753 discloses the addition of a poly(alkylated alkenyl phenol) to rubber as an antioxidant. However, poly(alkylated alkenyl phenols) do not have a great stabilizing effect when they are added alone to rubber or a resin.

SUMMARY OF THE INVENTION

An object of this invention is to provide a stabilized polypropylene polymer composition.

Another object of this invention is to provide a propylene polymer composition stabilized against oxidative deterioration at high temperatures.

Still another object of this invention is to provide a propylene polymer composition having superior stability to oxidation over long periods of time.

A further object of this invention is to provide a stabilized propylene polymer composition containing a stabilizer wherein there is reduced loss of the stabilizer by volatilization during processing at high temperature, the stabilizer is extracted by water, oils, etc., to a minimal extent and the propylene polymer is scarcely colored by the stabilizer. In contrast to conventional antioxidants, an extreme deterioration in performance of the poly(tert.-butylated p-vinylphenol) used as a stabilizer in this invention does not occur even when the amount of this compound is reduced.

The stabilized propylene polymer composition in accordance with this invention comprises (1) 100 parts by weight of a propylene polymer, (2) as a stabilizer, 0.001 to 5 parts by weight, preferably 0.01 to 1 part by weight, of a poly(tert.-butylated p-vinylphenol) composed substantially of monomeric units of the formula (I)

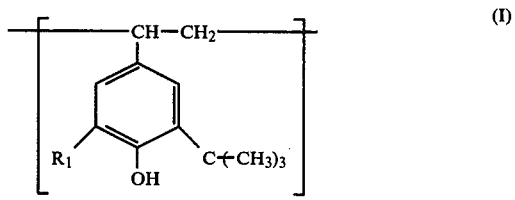

wherein $R_1$ represents a hydrogen atom or a tert.-butyl group, and (3) as an auxiliary stabilizer, 0.001 to 5 parts by weight, preferably 0.01 to 1 part by weight, of a dialkylthiodipropionate of the formula (II)

wherein R represents an alkyl group containing 10 to 20 carbon atoms.

DETAILED DESCRIPTION OF THE INVENTION

The alkyl group containing 10 to 20 carbon atoms represented by R in the dialkylthiodipropionate of the formula (II) may be a straight-chain, branched-chain, or cyclic alkyl group. Examples of suitable alkyl groups for R are decyl, undecyl, dodecyl, tridecyl, tetradecyl, pentadecyl, hexadecyl, heptadecyl, octadecyl, nonadecyl, eicosyl, branched $C_{10}$ alkyls, branched $C_{13}$ alkyls, butylcyclohexyl, and octylcyclohexyl groups. Of these groups, dodecyl (lauryl), tetradecyl (myristyl), and octadecyl (stearyl) groups are preferred. Suitable specific examples of dialkylthiodipropionates of the formula (II) are, for example, dilaurylthiodipropionate, dimyristylthiodipropionate, distearylthiodipropionate, didecylthiodipropionate, ditridecylthiodipropionate, dihexadecylthiodipropionate, dieicosylthiodipropionate, dibranched $C_{10}$-alkylthiodipropionate, dibranched $C_{13}$-alkylthiodipropionate, di(butylcyclohexyl)thiodipropionate, di(octylcyclohexyl)thiodipropionate, etc.

The poly(tert.-butylated p-vinylphenol) used in the present invention has a molecular weight of preferably about 500 to 30,000, and especially preferably 1,000 to 20,000, from the standpoint of volatility, stabilizing effect and compatibility with resins.

The poly(tert.-butylated p-vinylphenol) is a mono- or di-alkylated product of a polymer of p-vinylphenol of the formula (III)

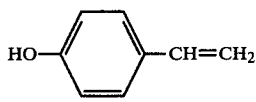
(III)

Poly(p-vinylphenol) from p-vinylphenol represented by the formula (III) is described in U.S. Pat. No. 4,028,340, U.S. Pat. No. 4,032,513 and *J. Chem. Soc.,* C 1968 (8) 996–9. The hydrolyzed products thereof, such as a polyacyloxystyrene or a polyalkoxystyrene, can also be used in this invention.

The poly(tert.-butylated p-vinylphenol) used in the present invention can be easily synthesized by a method involving alkylating poly(p-vinylphenol) with an alkylating agent such as isobutylene; a method in accordance with the method disclosed in *Polymer Letters Edition,* vol. 14, p 463–465 (1976) which comprises polymerizing an acetylated tert.-butylated p-vinylphenol and hydrolyzing the polymer obtained; or a method in accordance with the method disclosed in *Makromol. Chem.* 175 p. 791–810 (1974) which comprises synthesizing a tert.-butylated p-vinylphenol, and polymerizing the tert.-butylated p-vinylphenol. The first method described is especially preferred because the method is easy to conduct and the final product is obtained in good yields. More specifically, the first method comprises dispersing poly(p-vinylphenol) as a starting material (which can be produced by the processes described in U.S. Pat. No. 4,028,340 and U.S. Pat. No. 4,032,513) in a solvent such as benzene, toluene, etc. and bubbling an alkylating agent, such as isobutylene gas, thereinto in the presence of p-toluenesulfonic acid as a catalyst at a temperature of about 40° to 150° C. for about 5 minutes to about 24 hours, preferably 1 to 12 hours to obtain the poly(tert.-butylated p-vinylphenol). A preferred amount of poly(p-vinylphenol) present in the solvent is about 1 to 50 wt %. A preferred amount of catalyst is about 1 to 10 wt % based on the weight of the poly(p-vinylphenol).

The preparation of poly(tert.-butylated p-vinylphenol) used in this invention is described in detail by reference to the following Synthesis Example. Unless otherwise indicated herein, all parts, percents, ratios and the like are by weight.

SYNTHESIS EXAMPLE 6.2 g of poly(p-vinylphenol) having a number average molecular weight of 5,000 and 0.3 g of p-toluenesulfonic acid were dispersed in 30 ml of toluene, and the dispersion was heated to 70° C. Isobutylene gas was bubbled into the dispersion for 3 hours. The reaction mixture was cooled to room temperature, and a small amount of insoluble matter was removed by filtration. The filtrate was washed with a 10% by weight aqueous solution of $NaHCO_3$, and the toluene was distilled off. The residue was recrystallized from an ethanol/water mixture (1:4 by volume) to obtain a brown solid having a melting point of 133° C. [Stabilizer (1)].

As a result of I.R. analysis, it was found that the absorption at 830 $cm^{-1}$ of the starting material had disappeared, and a sharp absorption occurred at 3620 $cm^{-1}$. This confirmed that a tertiary butyl group was present at the two ortho-positions with respect to the hydroxyl group of the phenol ring. The resulting product had a molecular weight of 9,650, and a degree of alkylation of 100%.

The procedures of the Synthesis Example above were repeated using poly(p-vinylphenol) with varying molecular weights as starting materials. The stabilizers tabulated below were thus prepared.

| Stabilizer No. | Molecular Weight of Starting Poly(p-vinylphenol) | Molecular Weight after Alkylation | Degree of Alkylation (%) |
| --- | --- | --- | --- |
| (2) | 550 | 1,050 | 97 |
| (3) | 1,050 | 1,800 | 77 |
| (4) | 2,200 | 3,400 | 58 |
| (5) | 3,300 | 6,350 | 99 |
| (6) | 7,150 | 11,600 | 67 |
| (7) | 8,600 | 15,800 | 90 |

When the poly(tert.-butylated p-vinylphenol) or the dialkylthiodipropionate alone is added to a propylene polymer, the stabilizing effect is not very high. When they are added together, the stabilizing effect on the propylene polymer increases because of a synergistic effect which occurs. The amount of each of the poly(tert.-butylated p-vinylphenol) and the dialkylthiodipropionate used is 0.001 to 5 parts by weight, preferably 0.01 to 1 part by weight, per 100 parts by weight of the polymer. If the amount is less than 0.001 part by weight of each per 100 part by weight of the propylene polymer, an appreciable stabilizing effect is not obtained. When each is added in an amount larger than 5 parts by weight, no additional advantages attendant to the increased amount are obtained, and use of such an amount is rather economically disadvantageous.

The mixing of the propylene polymer with the stabilizers, and any other additives described hereinafter which may be present, can be performed in a conventional manner. For example, the stabilizers and additives may be mixed with the propylene polymer at a temperature above the softening point of the propylene polymer using a mixer such as a mixing roll.

Examples of propylene polymers which can be stabilized by the present invention are polypropylene (homopolymer), and copolymers of propylene and other ethylenically unsaturated monomers. Preferably, these propylene polymers have an average molecular weight of about 1,000 to about 1,000,000, especially 10,000 to 500,000. Examples of copolymers of propylene include a propylene/ethylene copolymer, a propylene/butene-1 copolymer, a propylene/vinyl chloride copolymer, a propylene/vinyl acetate copolymer, a propylene/vinyl alcohol copolymer, a propylene/ethylene/diene (e.g., butadiene, isoprene, cyclopentadiene) terpolymer, a propylene/methacrylate copolymer, a propylene/acrylate copolymer, a blend of polypropylene with another thermoplastic resin, a grafted copolymer of polypropylene, and a block copolymer of propylene.

The light resistance and the thermal resistance of the stabilized propylene polymer composition of this invention can also be improved by adding a phosphite-type compound to the composition. A suitable amount of the phosphite-type compound is preferably about 0.001 to 5 parts by weight per 100 parts by weight of the propylene polymer present in the composition.

Examples of suitable phosphite-type compounds which can be used include trioctyl phosphite, trilauryl phosphite, tridecyl phosphite, octyldiphenyl phosphite, triphenyl phosphite, tris(butuoxyethyl) phosphite, tris(-nonylphenyl) phosphite, distearyl pentaerythritol diphosphite, tetra(tridecyl)-1,1,3-tris(2-methyl-5-tert.-butyl-4-hydroxyphenyl)butane diphosphite, tetra($C_{12-15}$ mixed alkyl)-4,4'-isopropylidenediphenyl diphosphite, tetra(tridecyl)-4,4'-butylidenebis(3-methyl-6-tert.-butylphenol) diphosphite, tris(3,5-di-tert.-butyl-4-hydroxyphenyl) phosphite, tris(mono/di-mixed nonylphenyl) phosphite, hydrogenated 4,4'-isopropylidene diphenol polyphosphite, bis(octylphenyl)-bis[4,4'-butylidene-bis(3-methyl-6-tert.-butyl phenol)]-1,6-hexanediol diphosphite, phenyl 4,4'-isopropylidenediphenol pentaerythritol diphosphite, tris[4,4'-isopropylidenebis(2-tert.-butylphenol)] phosphite, phenyl diisodecyl phosphite, di(nonylphenyl) pentaerythritol diphosphite, tris(1,3-distearoyloxyisopropyl) phosphite, and 4,4'-isopropylidenebis(2-tert.-butyl phenol) di(nonylphenyl) phosphite.

The oxidation stability of the propylene polymer composition of this invention can be further improved, if desired, by adding another phenolic antioxidant thereto. A suitable amount of the other phenolic antioxidant is preferably about 0.001 to 5 parts by weight per 100 parts by weight of the propylene polymer present in the composition. Examples of suitable phenolic antioxidants which can be used include phenols such as 2,6-ditert.-butyl-p-cresol, stearyl-(3,5-dimethyl-4-hydroxybenzyl)thioglycolate, stearyl-β-(4-hydroxy-3,5-ditert.-butylphenyl) propionate, distearyl-3,5-ditert.-butyl-4-hydroxybenzyl phosphonate, 2,4,6-tris(3',5'-ditert.-butyl-4'-hydroxybenzylthio)-1,3,5-triazine, distearyl-(4-hydroxy-3-methyl-5-tert.-butyl)benzyl malonate, 2,2'-methylene-bis(4-methyl-6-tert.-butylphenol), 4,4'-methylenebis(2,6-ditert.-butylphenol), 2,2'-methylene-bis[6-(1-methylcyclohexyl)p-cresol], bis[3,3-bis(4-hydroxy-3-tert.-butylphenyl)butyric acid] glycol ester, 4,4'-butylidene-bis(6-tert.-butyl-m-cresol), 1,1,3-tris(2-methyl-4-hydroxy-5-tert.-butylphenyl)butane, 1,3,5-tris(3,5-di-tert.-butyl-4-hydroxybenzyl)-2,4,6-trimethylbenzene, tetrakis[methylene-3-(3,5-di-tert.-butyl-4-hydroxyphenyl) propionate] methane, 1,3,5-tris(3,5-di-tert.-butyl-4-hydroxybenzyl)isocyanurate, 1,3,5-tris[(3,5-di-tert.-butyl-4-hydroxyphenyl)propionyloxyethyl]isocyanurate, 2-octylthio-4,6-di(4-hydroxy-3,5-ditert.-butyl)phenoxy-1,3,5-triazine, and 4,4'-thiobis(6-tert.-butyl-m-cresol); and carbonic acid oligoesters of polyhydric phenols such as a carbonic acid oligoester (with a degree of polymerization of, for example, 2,3,4,5,6,7,8,9,10) of 4,4'-butylidenebis(2-tert.-butyl-5-methylphenol).

The light resistance of the composition of this invention can further be improved, if desired, by adding a light stabilizer thereto. A suitable amount of the light stabilizer is preferably about 0.001 to 5 parts by weight per 100 parts by weight of the propylene polymer present in the composition. Examples of suitable light stabilizers which can be used include hydroxybenzophenones such as 2-hydroxy-4-methoxybenzophenone, 2-hydroxy-4-n-octoxybenzophenone, 2,2'-dihydroxy-4-methoxybenzophenone and 2,4-dihydroxybenzophenone; benzotriazoles such as 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-5'-methylphenyl) benzotriazole, and 2-(2'-hydroxy-3',5'-di-t-amylphenyl)benzotriazole; piperidines such as bis-2,2,6,6-tetramethyl-4-piperidyl sebacate and 2,2,6,6-tetramethyl-4-piperidyl benzoate; benzoates such as phenyl salicylate, p-t-butylphenyl salicylate and 2,4-di-t-butylphenyl-3,5-di-t-butyl-4-hydroxybenzoate; nickel compounds such as 2,2'-thiobis(4-t-octylphenol) nickel salt, [2,2'-thiobis(4-t-octylphenolate)]-n-butylamine nickel salt, and (3,5-di-t-butyl-4-hydroxybenzyl) phosphonic acid monoethyl ester nickel salt; and substituted acrylonitriles such as methyl α-cyano-β-methyl-β-(p-methoxyphenyl)acrylate.

The stabilized propylene polymer composition of this invention may further contain other additives, if desired. For example, a plasticizer such as dioctyl phthalate, dioctyl adipate and tricresyl phosphate may be employed in an amount of about 30 to 60 parts by weight per 100 parts by weight of the propylene polymer. A fire retardant such as hexabromobenzene, tetrabromo-bisphenol A and antimony trioxide may be employed in an amount of about 5 to 30 parts by weight per 100 parts by weight of the propylene polymer. Furthermore, a metal deactivating agent such as salicylic acid hydrazide, oxanilide and N-salicyloyl-N'-salicylidene hydrazine; a nucleating agent such as 4-tert-butylbenzoic acid, adipic acid or diphenylacetic acid; a metal soap such as calcium stearate, zinc stearate and barium stearate; an organic tin compound such as dibutyltin maleate, and dibutyltin dilaurate; an epoxy compound such as an epoxidized fatty oil; a pigment such as carbon black, $PbCrO_4$ and $Mn_2(PO_4)_3$; a filler such as calcium carbonate and clay; a foaming agent such as sodium bicarbonate, butane, azodicarbonamide, and a diisocyanate; an antistatic agent such as a cationic surface-active agent; and a lubricant such as montanic acid or stearic acid may be employed each in an amount of about 0.005 to 5 parts by weight per 100 parts by weight of the propylene polymer.

The following Examples are given to illustrate the present invention more specifically. These examples are merely illustrative, and should not be construed as limiting the invention in any way.

EXAMPLE 1

The following components were kneaded using a mixing roll at 180° C. for 5 minutes, and the mixture was compression-molded at 180° C. and 250 kg/cm² for 5 minutes to form test pieces having a thickness of 1 mm.

| Formulation | parts by weight |
| --- | --- |
| Unstabilized Polypropylene Resin (melt flow index 4 g/10 min., 230° C., 2160 g, JIS K6758, produced by Hercules Powder Co.) | 100 |
| Calcium Stearate | 0.2 |
| Phenolic Compound (as shown in Table 1) | 0.1 |
| Dilaurylthiodipropionate | 0.3 |

These test pieces were subjected to heat stability testing in a Geer oven at 160° C. The results were rated by the time which elapsed until at least five of the 10 samples from the same composition had discolored and became waxy. Furthermore, the degree of yellowing (%) of the test pieces after exposure to a fluorescent lamp for 24 hours and 72 hours, respectively, was measured using a Hunter colorimeter. Furthermore, the same heat stability test was performed using the same test pieces which had been immersed in hot water at 90° C. for 7 days. The results obtained are shown in Table 1 below.

TABLE 1

| Run No. | Phenolic Compound of the Formula (I) | Heat Stability (hours) | Heat Stability after Immersion in Hot Water (hours) | Degree of Yellowing Original (%) | 24 Hours Later (%) | 72 Hours Later (%) |
| --- | --- | --- | --- | --- | --- | --- |
| Comparison | | | | | | |
| 1-1 | *(1) | less than 24 | less than 24 | 18.4 | 32.9 | 46.6 |
| 1-2 | Stabilizer (1)*(2) | 96 | 83 | 15.1 | 25.0 | 38.4 |
| 1-3 | Stabilizer (3)*(2) | 132 | 120 | 10.2 | 14.1 | 21.5 |
| 1-4 | Stabilizer (6)*(2) | 100 | 91 | | | |
| Example | | | | | | |
| 1-1 | Stabilizer (1) | 310 | 284 | 8.2 | 9.7 | 11.4 |
| 1-2 | Stabilizer (2) | 287 | 252 | 9.7 | 11.2 | 13.8 |
| 1-3 | Stabilizer (3) | 280 | 248 | 10.3 | 12.3 | 14.0 |
| 1-4 | Stabilizer (4) | 265 | 232 | 9.0 | 10.2 | 12.3 |
| 1-5 | Stabilizer (5) | 303 | 276 | 8.8 | 10.0 | 11.9 |
| 1-6 | Stabilizer (6) | 254 | 229 | 10.1 | 12.1 | 13.6 |
| 1-7 | Stabilizer (7) | 298 | 273 | 9.4 | 10.8 | 12.5 |

*(1)No phenolic compound employed.
*(2)No dilaurylthiopropionate employed.

EXAMPLE 2

It is known that ordinary antioxidants are markedly consumed during the high-temperature processing of resins due to volatilization, etc., and the degree of consumption greatly affects the properties of the processed resins. This effect was confirmed in this Example by repeated extrusion.

A propylene polymer and additives were mixed in accordance with the following formulation using a mixer for 5 minutes, and a compound was prepared by employing an extruder (50 mm·φ) (cylinder temperature: 230° C.; 240° C.; head die temperature: 250° C.; rotation speed: 20 rpm).

| Formulation | parts by weight |
| --- | --- |
| Unstabilized Ethylene/Propylene Copolymer (melt flow index 3 (g/10 min.), 230° C.: 2160 g, JIS K6758; propylene:ethylene = 77:23 by weight; a product of Hercules Powder Co.) | 100 |
| Calcium Stearate | 0.2 |
| Distearylthiodipropionate | 0.2 |
| Phenolic Compound (as shown in Table 2) | 0.2 |

The extrusion was performed repeatedly five times. The resulting compound then was injection-molded using an injection-molding machine to produce test pieces having a size of 95×40×1 mm (cylinder temperature: 240° C.; nozzle temperature: 250° C.; injection pressure: 475 kg/cm$^2$).

The resulting test pieces were placed in an oven at 160° C., and the time which elapsed until at least 5 out of the ten test pieces had discolored was determined and was defined as the degradation time.

For comparison, test pieces were prepared in the same manner as described above from a compound obtained in only one extrusion, and the test pieces were tested in the same manner.

The results obtained are shown in Table 2 below.

TABLE 2

| Run No. | Phenolic Compound | Degradation Time after One Extrusion (hours) | Degradation Time after Five Extrusions (hours) |
| --- | --- | --- | --- |
| Comparison | | | |
| 2-1 | 2,6-Di-tert.-butyl-p-cresol | 135 | 10 |
| 2-2 | 4,4'-n-Butylidenebis(3-methyl-6-tert.-butyl phenol) | 183 | 38 |
| Example | | | |
| 2-1 | Stabilizer (1) | 328 | 295 |
| 2-2 | Stabilizer (2) | 301 | 256 |
| 2-3 | Stabilizer (3) | 295 | 256 |
| 2-4 | Stabilizer (4) | 284 | 250 |
| 2-5 | Stabilizer (5) | 319 | 284 |
| 2-6 | Stabilizer (6) | 268 | 236 |
| 2-7 | Stabilizer (7) | 310 | 279 |

The results shown in Table 2 above demonstrate that the propylene copolymer composition comprising a specific phenolic stabilizer and a dialkylthiodipropionate has excellent stability in comparison with a propylene copolymer containing 2,6-di-tert.-butyl-p-cresol and a propylene copolymer containing 4,4'-n-butylidenebis(3-methyl-6-tert.-butyl phenol), and that substantially no stabilizer is vaporized.

EXAMPLE 3

The following components were kneaded using a mixing roll at 180° C. for 5 minutes, and the mixture was compression-molded at 180° C. and 250 kg/cm$^2$ for 5 minutes to prepare test pieces having a thickness of 1 mm.

| Formulation | parts by weight |
| --- | --- |
| Unstabilized Polypropylene (melt flow index 4 g/10 min., 230° C., 2160 g, JIS K6758, produced by Hercules Powder Co.) | 100 |
| Calcium Stearate | 0.2 |
| Dilaurylthiodipropionate | 0.3 |
| Phenolic Compound (as shown in Table 3) | given in Table 3 |

These test pieces were subjected to heat stability testing in a Geer oven at 160° C. Furthermore, the same test pieces were immersed in hot water at 90° C. for 7 days, and then subjected to heat stability testing in a Geer oven at 160° C. The results obtained are shown in Table 3 below:

TABLE 3

| Run No. | Phenol Compound Type | Amount (parts by weight) | Heat Stability (hours) | Heat Stability after Immersion in Hot Water (hours) |
|---|---|---|---|---|
| Comparison | | | | |
| 3-1 | 2,6-Di-t-butyl-p-cresol | 0.025 | 84 | 25 |
| 3-2 | 2,6-Di-t-butyl-p-cresol | 0.1 | 138 | 75 |
| Example | | | | |
| 3-1 | Stabilizer (5) | 0.025 | 271 | 202 |
| 3-2 | Stabilizer (5) | 0.05 | 295 | 272 |
| 3-3 | Stabilizer (5) | 0.1 | 303 | 276 |

The results shown in Table 3 above demonstrate that the phenolic stabilizer used in the present invention is different from an antioxidant such as 2,6-di-tert.-butyl-p-cresol, whereby even if the amount employed is small, the stability is not markedly reduced and substantially no stabilizer is extracted with water.

EXAMPLE 4

The following components were kneaded using a mixing roll at 180° C. for 5 minutes, and the mixture was compression-molded at 180° C. and 250 kg/cm² for 5 minutes to prepare test pieces having a thickness of 1 mm.

| Formulation | parts by weight |
|---|---|
| Unstabilized Polypropylene (melt flow index 4 g/10 min., produced by Hercules Powder Co.) | 100 |
| Dilaurylthiodipropionate | 0.1 |
| Phenolic Compound (as shown in Table 4) | 0.5 |

Three test pieces (30×20 mm) were immersed in 50 ml of n-heptane, and extracted at 70° C. for 3 hours. The test pieces after the extraction and unextracted test pieces were placed in a Geer oven at 150° C., and the heat stability was evaluated by the heat degradation time. The results obtained are shown in Table 4 in terms of the ratio of the degradation time of an extracted test piece to the degradation time of an unextracted test piece.

TABLE 4

| Run No. | Phenolic Compound | Degradation Time Ratio |
|---|---|---|
| Comparison | | |
| 4-1 | 1,3,5-Trimethyl-2,4,6-tris(3,5-di-t-butyl-4-hydroxybenzyl)benzene | 0.08 |
| 4-2 | Tris(3,5-di-t-butyl-4-hydroxy-benzyl)isocyanurate | 0.16 |
| Example | | |

TABLE 4-continued

| Run No. | Phenolic Compound | Degradation Time Ratio |
|---|---|---|
| 4-1 | Stabilizer (3) | 0.62 |
| 4-2 | Stabilizer (4) | 0.65 |

The results shown in Table 4 demonstrate that substantially none of the phenolic stabilizer used in the present invention is extracted with oil.

While the invention has been described in detail and with reference to specific embodiments thereof, it will be apparent to one skilled in the art that various changes and modifications can be made therein without departing from the spirit and scope thereof.

What is claimed is:

1. A propylene polymer composition stabilized against oxidative degradation comprising
   (1) 100 parts by weight of a propylene polymer,
   (2) 0.001 to 5 parts by weight of a poly(tert.-butylated p-vinylphenol) composed substantially of monomeric units of the formula (I)

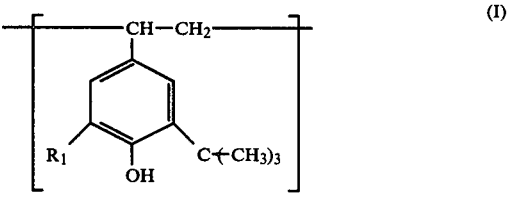

wherein $R_1$ represents a hydrogen atom or a tertiary butyl group, and
   (3) 0.001 to 5 parts by weight of a dialkylthiodipropionate of the formula (II)

wherein R represents an alkyl group containing 10 to 20 carbon atoms.

2. The composition of claim 1, wherein the propylene polymer is polypropylene, or a copolymer of propylene and another ethylenically unsaturated monomer copolymerizable therewith.

3. The composition of claim 2, wherein the copolymer of propylene and another ethylenically unsaturated monomer is an ethylene/propylene copolymer, a propylene/butene-1 copolymer, a propylene/vinyl chloride, copolymer, a propylene/vinyl acetate copolymer, a propylene/vinyl alcohol copolymer, a propylene/ethylene/diene terpolymer, a propylene/acrylate copolymer, or a propylene/methacrylate copolymer.

4. The composition of claim 1, wherein the dialkylthiodipropionate is dilaurylthiodipropionate, dimyristylthiodipropionate, distearylthiodipropionate, didecylthiodipropionate, ditridecylthiodipropionate, dihexadecylthiodipropionate, dieicosylthiodipropionate, dibranched $C_{10}$-alkylthiodipropionate, dibranched $C_{13}$-alkylthiodipropionate, di(butylcyclohexyl)thiodipropionate, or di(octylcyclohexyl)thiodipropionate.

5. The composition of claim 1, wherein the molecular weight of the poly(tert.-butylated p-vinylphenol) is about 500 to about 30,000.

6. The composition of claim 1, wherein the molecular weight of the poly(tert.-butylated p-vinylphenol) is 1,000 to 20,000.

* * * * *